United States Patent [19]

Matsuoka et al.

[11] Patent Number: 5,550,686
[45] Date of Patent: Aug. 27, 1996

[54] APPARATUS FOR TAPE LOADING DEVICE

[75] Inventors: Hidetoshi Matsuoka, Tokyo; Kouji Hashimoto, Matsudo; Junji Kobayashi, Tokyo, all of Japan

[73] Assignee: Canon Kabushiki Kaisha, Tokyo, Japan

[21] Appl. No.: 261,940

[22] Filed: Jun. 17, 1994

Related U.S. Application Data

[63] Continuation-in-part of Ser. No. 970,843, Nov. 3, 1992, Pat. No. 5,363,257.

[30] Foreign Application Priority Data

Nov. 29, 1991 [JP] Japan ................... 3-340004
Jun. 29, 1992 [JP] Japan ................... 4-194965

[51] Int. Cl.$^6$ ........................ G11B 15/66
[52] U.S. Cl. ........................ 360/85
[58] Field of Search ................ 360/84–85, 95

[56] References Cited

U.S. PATENT DOCUMENTS

| | | | |
|---|---|---|---|
| 5,113,296 | 5/1992 | Kaneko et al. | 360/85 |
| 5,196,971 | 3/1993 | Tsuchiya et al. | 360/85 |
| 5,285,332 | 2/1994 | Konishi et al. | 360/85 |
| 5,291,351 | 3/1994 | Takita et al. | 360/95 X |

FOREIGN PATENT DOCUMENTS

| | | | |
|---|---|---|---|
| 5-151668 | 6/1993 | Japan | G11B 15/665 |
| 6-12749 | 1/1994 | Japan | G11B 15/665 |

*Primary Examiner*—John H. Wolff
*Attorney, Agent, or Firm*—Fitzpatrick, Cella, Harper & Scinto

[57] ABSTRACT

Apparatus for loading and unloading a tape-type recording medium in a recording/reproducing device, such as a VTR. The apparatus has a rotary drum carrying magnetic heads, and a pair of rail members arranged around the rotary drum and each having a first elongated slot formed therein. Tape guides are guided along respective rail members, and a drum base is provided having a drum support portion for supporting the rotary drum. Second elongated slots are formed at the outer side of the drum support portion, the second elongated slots being connected to corresponding first elongated grooves so as to form continuous guide grooves for guiding the tape guides. Interconnectors are provided either on the drum base or on the rail members so as to interconnect the portions which define the elongated slots in the regions of these grooves near their open ends to prevent bending of the slots.

8 Claims, 9 Drawing Sheets

APPARATUS FOR TAPE LOADING DEVICE

BACKGROUND OF THE INVENTION

This application is a continuation-in-part of application Ser. No. 07/970,843, filed Nov. 3, 1992, now U.S. Pat. No. 5,363,257, issued Nov. 8, 1994.

1. Field of the Invention

The present invention relates to a tape loading device suitable for use in VTRs (Video Tape Recorders), and more particularly, to a tape loading device designed to load a tape in a predetermined running path by the movement of a loading or guide post which is achieved by the rotation of a loading ring. The present invention is also concerned with a recording/reproducing apparatus of the type in which a tape recording medium is loaded on a predetermined tape running path (which includes part of the outer peripheral surface of the rotary drum) by the operation of guide bases which carry loading or guide posts, so as to enable recording and/or reproduction.

2. Description of a Related Art

A tape loading device for use in conventional VTRs has the structure shown in, for example, FIGS. 1, 8, and 9. That is, first and second loading rings 71 and 72 are mounted on a drum base 73 on which a rotary head drum 20 is mounted. A post or guide base 74 (on which a loading post 74a is mounted) is moved to a predetermined position along a guide member 77 by rotation of a first ring 71 while post or guide bases 75 and 76 (with loading posts 75a and 76a respectively mounted thereon) are moved to predetermined positions along a guide member 78 by the rotation of the second ring 72, whereby a tape 21 is pulled out from a tape cassette (not shown) and is then loaded in a predetermined running path including the peripheral surface of the rotary head drum 20. The guide bases 74 and 75 are located by guide base locating portions 80 and 81 which are provided on the drum base 73.

Also, the drum base 73 has three shafts 70 planted on the lower portion thereof. Three rollers 79a through 79c and three rollers 79d through 79f rotatably supported on the shafts 70 retain the inner peripheral surfaces of the first and second rings 71 and 72 and thereby rotatably support the first and second rings 71 and 72 on the drum base 73.

Even if the rings 71 and 72 are disposed on a chassis on which the drum base is mounted (alternately, on a chassis formed integrally with the drum base) and are substantially rotatably mounted in the drum base, the same rollers and shafts as those described above are used.

However, in the aforementioned conventional loading device, rotatable retention of the ring 71 (72) requires at least the three rollers 79a through 79c (79d through 79f), three shafts 70 for rotatably supporting the rollers 79a through 79c (79d through 79f), and fixing members, such as mold washers and screws. Thus, the number of parts required is greatly increased, increasing the cost of the VTR.

Furthermore, the increased number of parts and the mounting of the ring 71 (72) on the three rollers 79a through 79c (79d through 79f) make the assembly work of the VTR very complicated.

In addition, since a burr generated on the inner peripheral portion of the ring 71 (72) during pressing of the ring 71 (72) may damage the rollers 79a through 79c (79d through 79f) while the ring 71 (72) is rotated, burrs must be removed over substantially the entire circumference of the inner peripheral portion. However, this burr removing work is very troublesome.

The known recording/reproducing apparatuses of the type described above also suffer from the following disadvantages.

The rail members 77 and 78 are respectively connected to the post or guide base locating portions 80 ad 81 which are provided on the drum base 73 and which respectively have elongated slots 80a and 81a. The elongated slots are simply configured so as to be open at their ends. Elongated slots 77a and 78a formed in the rail members 77 and 78 also are configured to open at their ends.

Therefore, when the guide bases 74 and 75 are brought into engagement with the locating portions 80 and 81, the locating portions 80 and 81 tend to be deformed due to application of excessive forces on the portions which determine the outer edges of the elongated slots 80a and 81a. This is quite inconvenient for production of the drum base 73 by molding, from the viewpoint of mechanical strength.

SUMMARY OF THE INVENTION

Accordingly, an object of the present invention is to provide a recording/reproducing apparatus which is improved in such a manner as to eliminate deformation of the locating portions and elongated slots.

To this end, according to the present invention, there is provided a recording/reproducing apparatus for recording and/or reproducing information on and/or from a tape-type recording medium, comprising a rotary drum carrying at least one magnetic head; at least one rail member arranged in the vicinity of the rotary drum and having a first elongated slot formed therein; at least one tape guide which is guided along the rail member; a drum base having a drum support portion for supporting the rotary drum, and a second elongated slot formed at the outer side of the drum support portion, the second elongated slot being connected to the first elongated slot so as to form a continuous guide groove for guiding the tape guide; and at least one interconnector which is provided on at least one of the drum base and the rail member so as to interconnect the portions of the drum base and/or the rail member which oppose each other across the first and/or second elongated slots.

Other objects and features of this invention will become apparent from the following detailed description of embodiments thereof taken in conjunction with the accompanying drawings.

DETAILED DESCRIPTION OF THE PREFERRED EMBODIMENTS

An embodiment of the present invention which is applied to a tape loading device for VTRs will be described below with reference to FIGS. 2 through 7, 10, and 11.

Figure 1:
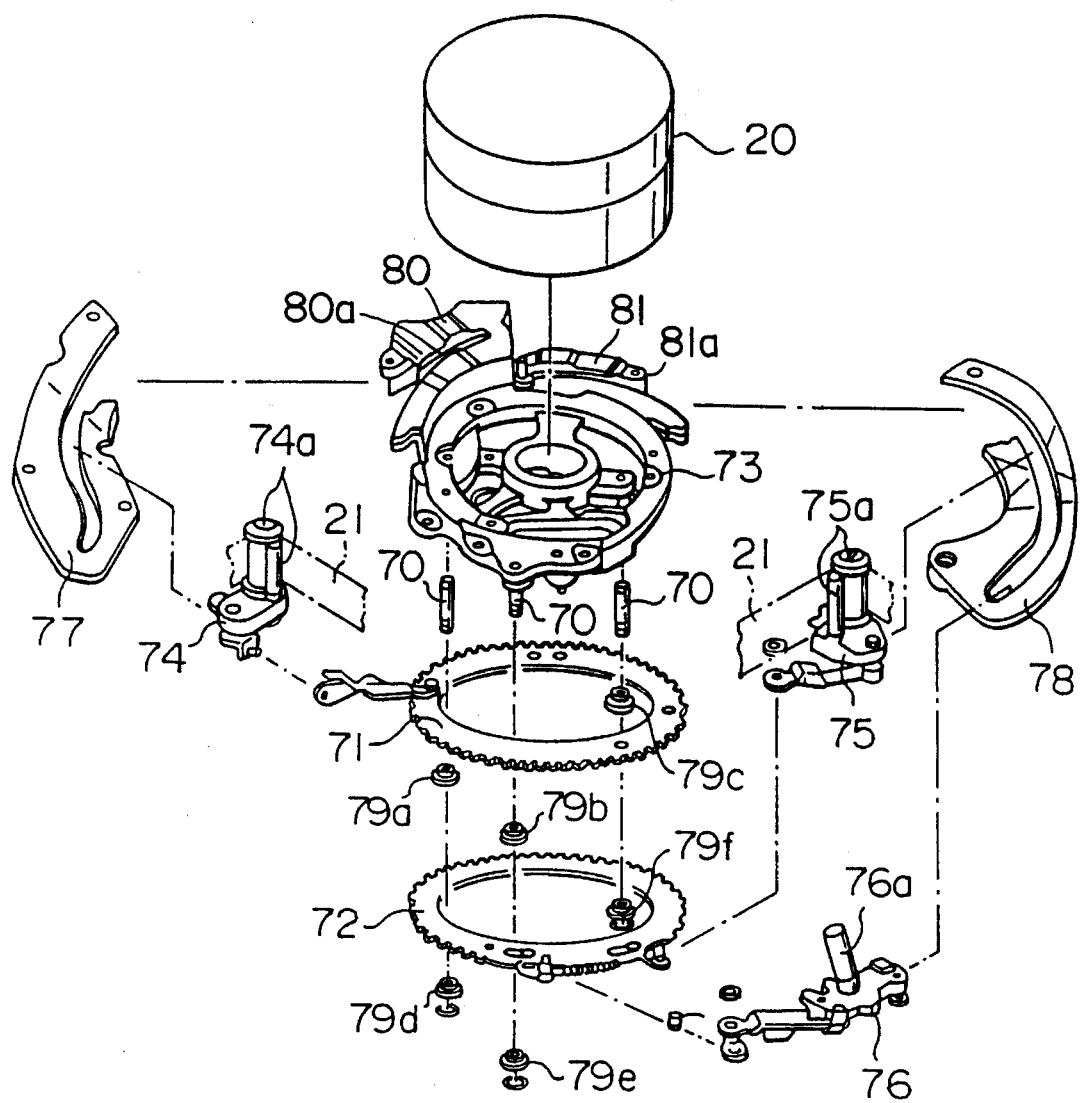
FIG. 1 is an exploded perspective view of a conventional tape loading device.
Figure 2:
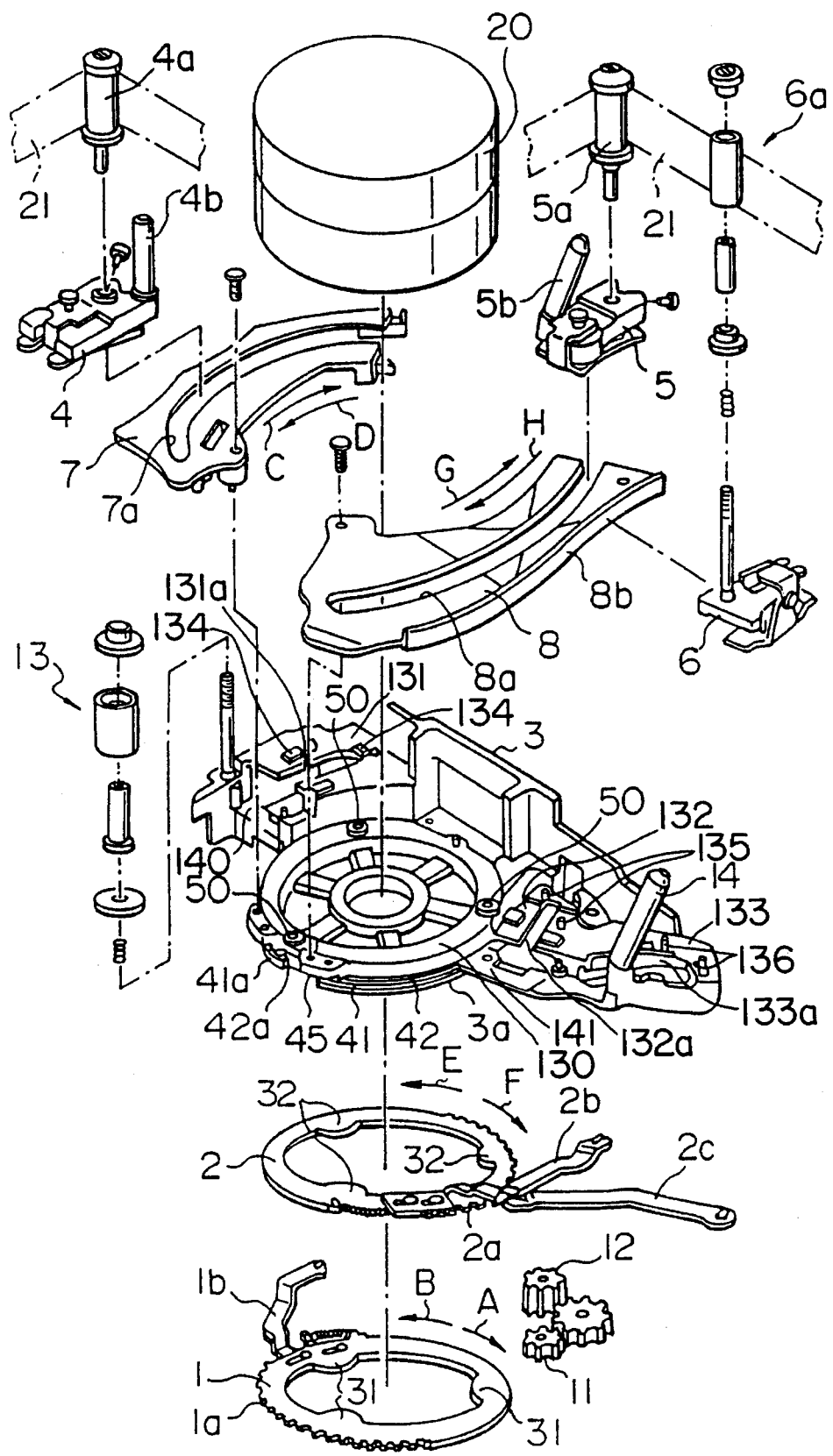
FIG. 2 is an exploded perspective view showing an embodiment of the present invention which is applied to a tape loading device for VTRs.
Figure 3:
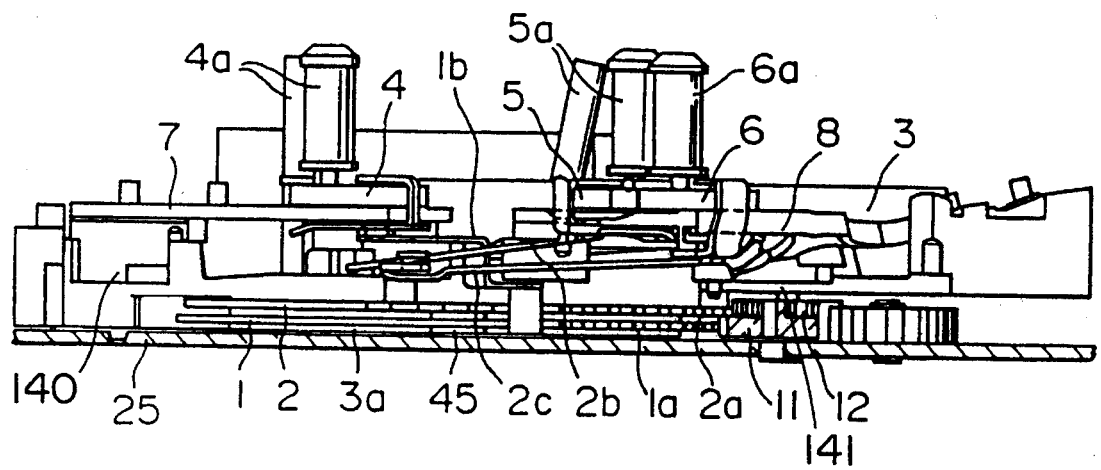
FIG. 3 is a side elevational view of the device of FIG. 2.

As shown in FIGS. 2 and 3, first and second loading rings 1 and 2 can be mounted on the lower portion of a drum base 3 on which a rotary head drum 20 is mounted.

The first ring 1 has a toothed portion 1a on an outer peripheral portion thereof. When the first ring 1 is rotated in directions indicated by arrows A and B by a driving gear 11 engaging with the toothed portion 1a, an arm 1b of the first ring 1 moves a post base 4 along a guide groove 7a of a guide member 7 in directions indicated by arrows C an D.

The second ring 2 has a toothed portion 2a on an outer peripheral portion thereof. The second ring 2 is rotated in directions indicated by arrows E and F which are opposite to directions A and B in which the first ring 1 is rotated by a driving gear 12 engaging with the toothed portion 2a. At that time, arms 2b and 2c of the second ring 2 move post or guide bases 5 and 6 along a guide groove 8a and a guide rail 8b of the guide member 8, respectively, in directions indicated by arrows G and H.

Consequently, loading posts 4a, 4b, 5a, 5b and 6a respectively mounted on the post bases 4, 5 and 6 move back and forth between a tape pulling out position where they pull out the tape 21 from a tape cassette (not shown) and a loading completing position where they thread the tape 21 which has been pulled out along a predetermined running path including the peripheral surface of the rotary head drum 20.

Interconnecting portions 140, 141 shown in FIGS. 2–6 will be described later with specific reference to FIGS. 2, 10, and 11.

As shown in FIGS. 2 and 5 through 7, the first and second rings 1 and 2 have three protruding portions 31 and 32, respectively, at the inner peripheral portions thereof. The protruding portions 31 and 32 are disposed equidistantly around the inner peripheral portions and protrude in the radial directions. The protruding portion 31 and 32 engage with circumferential groove portions 41 and 42 formed on the lower portion of the drum base 3, respectively, the groove portions 41 and 42 (described in detail later), whereby the rings 1 and 2 are rotatably supported on the drum base 3. The distal end portion of each of the protruding portions 31 and 32 is formed in an arcuate (convex) form, while the upper and lower surfaces of each of the protruding portions 31 and 32 are each curved in an arcuate form (pinched toward the distal end) so as to facilitate the engagement of the protruding portions 31 and 32 into the groove portions 41 and 42.

As shown in FIGS. 2 and 4 through 7, the drum base 3 has a cylindrical ring mounting portion 3a on the lower portion thereof. The portion 3a is formed integrally with the drum base 3. On the outer peripheral portion of the ring mounting portion 3a are formed two groove portions 41 and 42 to rotatably support the first and second rings 1 and 2 on the drum base 3. On the outer peripheral portion of the ring mounting portion 3a are also formed three introducing or recessed portions 45 which are open outwardly and downwardly. The recessed portions 45 each have an arcuate (concave) form so that they match the protruding portions 31 and 32 of the rings 1 and 2. The recessed portions 34, which are notches partially formed on the lower surfaces of the groove portions 41 and 42, form introducing or recessed portions 41a and 42a into which the protruding portions 31 and 32 are placed so that they may be inserted into the groove portions 41 and 42, respectively.

Figure 6:
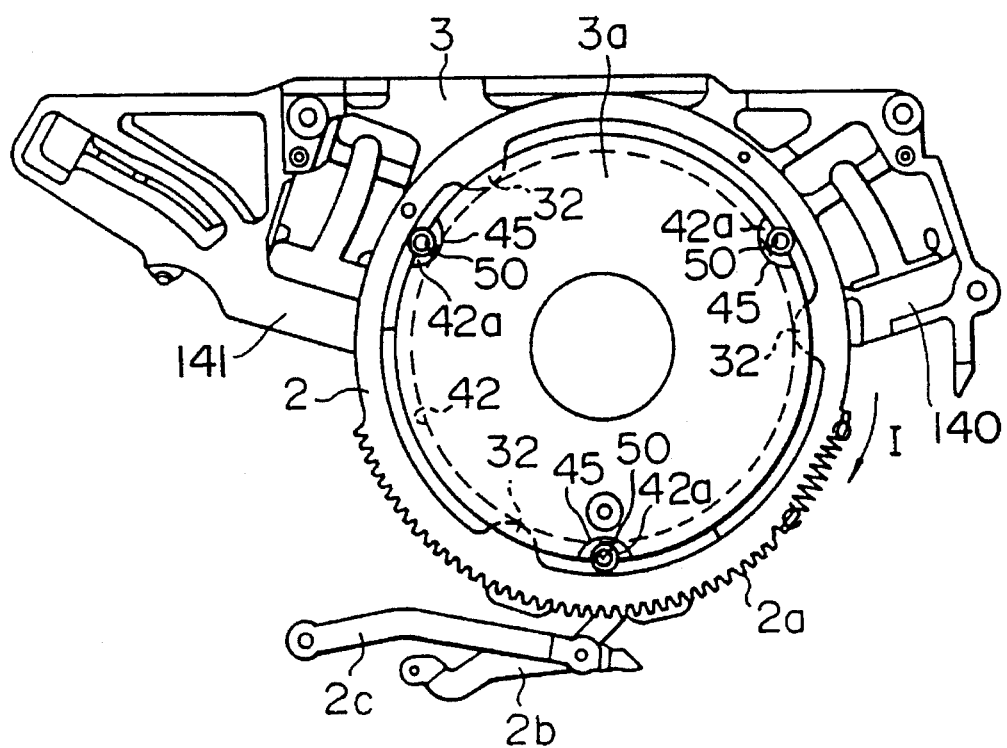
FIG. 6 is a bottom view illustrating the assembly of the ring on the drum base rotated with respect to FIG. 5.

As shown in FIGS. 2 and 6, a screw inserting hole 50 is provided above each of the recessed portions 45 (which constitute the introducing portions 41a and 42a) for tightening (for example, screwing) the rotary head drum 20 on the drum base 3.

As shown in FIG. 2, on the upper surface of the drum base 3 are mounted a vertical guide post 13 and an inclined guide post 14. In addition, positioning portions for positioning the post bases 4, 5 and 6 are also formed on the upper surface of the drum base 3 integrally therewith.

The assembling operation of the first and second loading rings 1 and 2 on the drum base 3 will be described below with reference to FIGS. 4 through 7.

Figure 4:
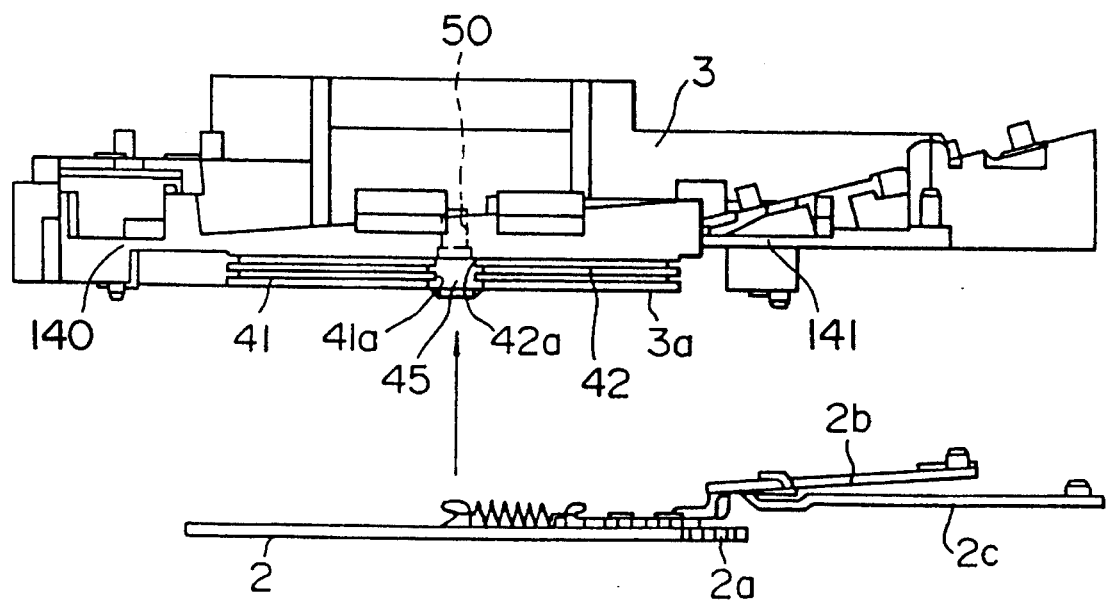
FIG. 4 is a side elevational view illustrating the assembly of a ring on a drum base.
Figure 5:
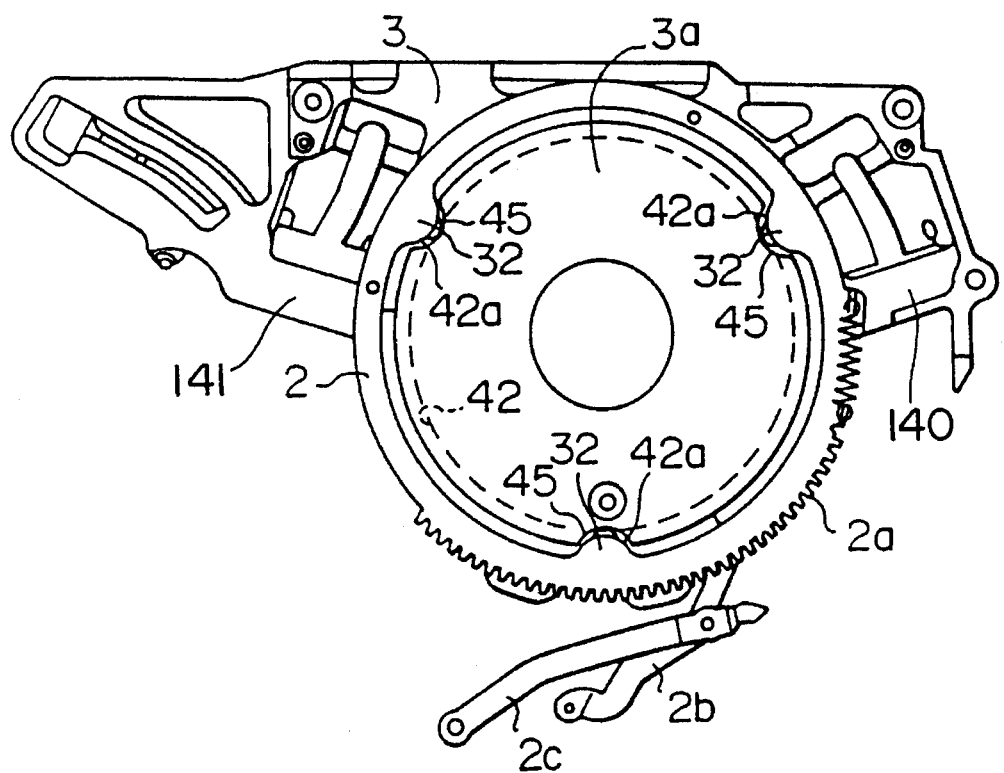
FIG. 5 is a bottom view illustrating the assembly of the ring on the drum base.

After the ring 2 is positioned below the ring mounting portion 3a of the drum base 3 such that the three protruding portions 32 of the ring 2 respectively oppose the three recessed portions 45 of the ring mounting portion 3a, the ring 2 is relatively fitted onto the outer side of the ring mounting portion 3a (see FIGS. 4, 5 and 7(a)).

Figure 7:
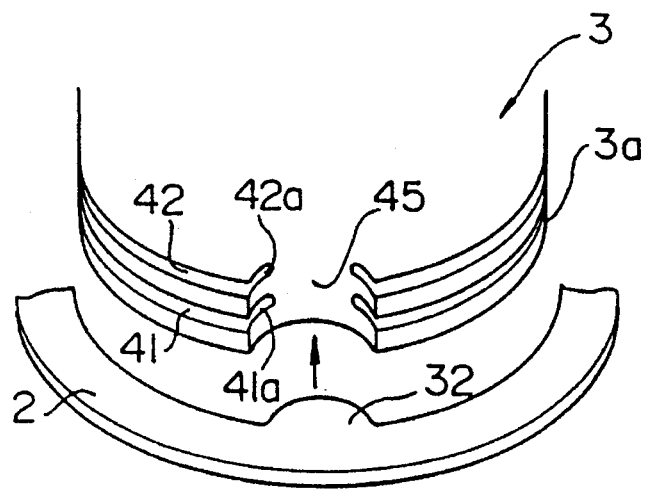
FIG. 7 (comprising FIGS. 7(a), 7(b), and 7(c)) is a perspective view illustrating the assembly of the ring on the drum base.
Figure 7B:
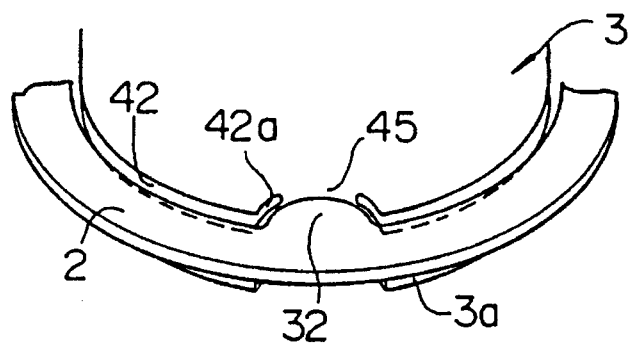
Figure 7C:
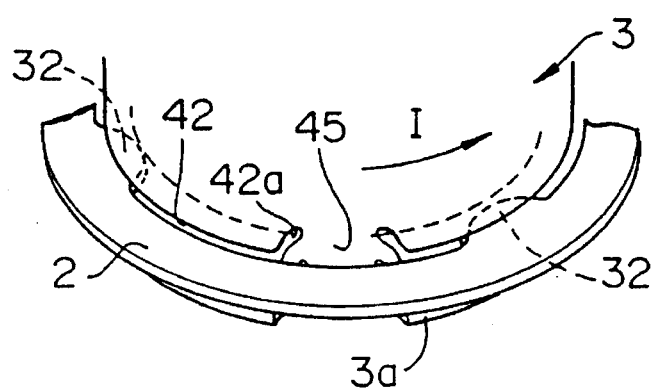
Figure 8:
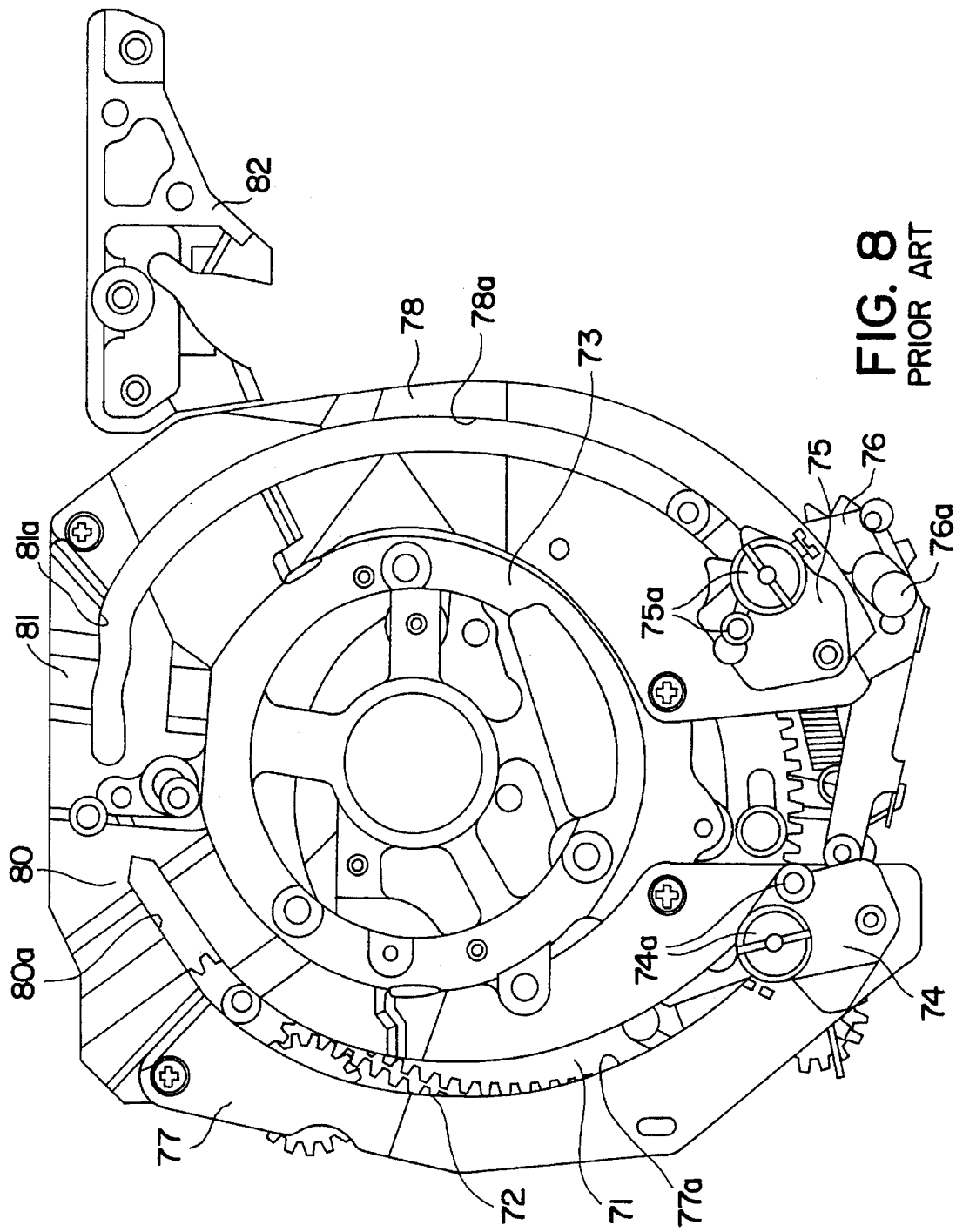
FIG. 8 is a plan view of the VTR shown in FIG. 1 in an unloaded state.
Figure 9:
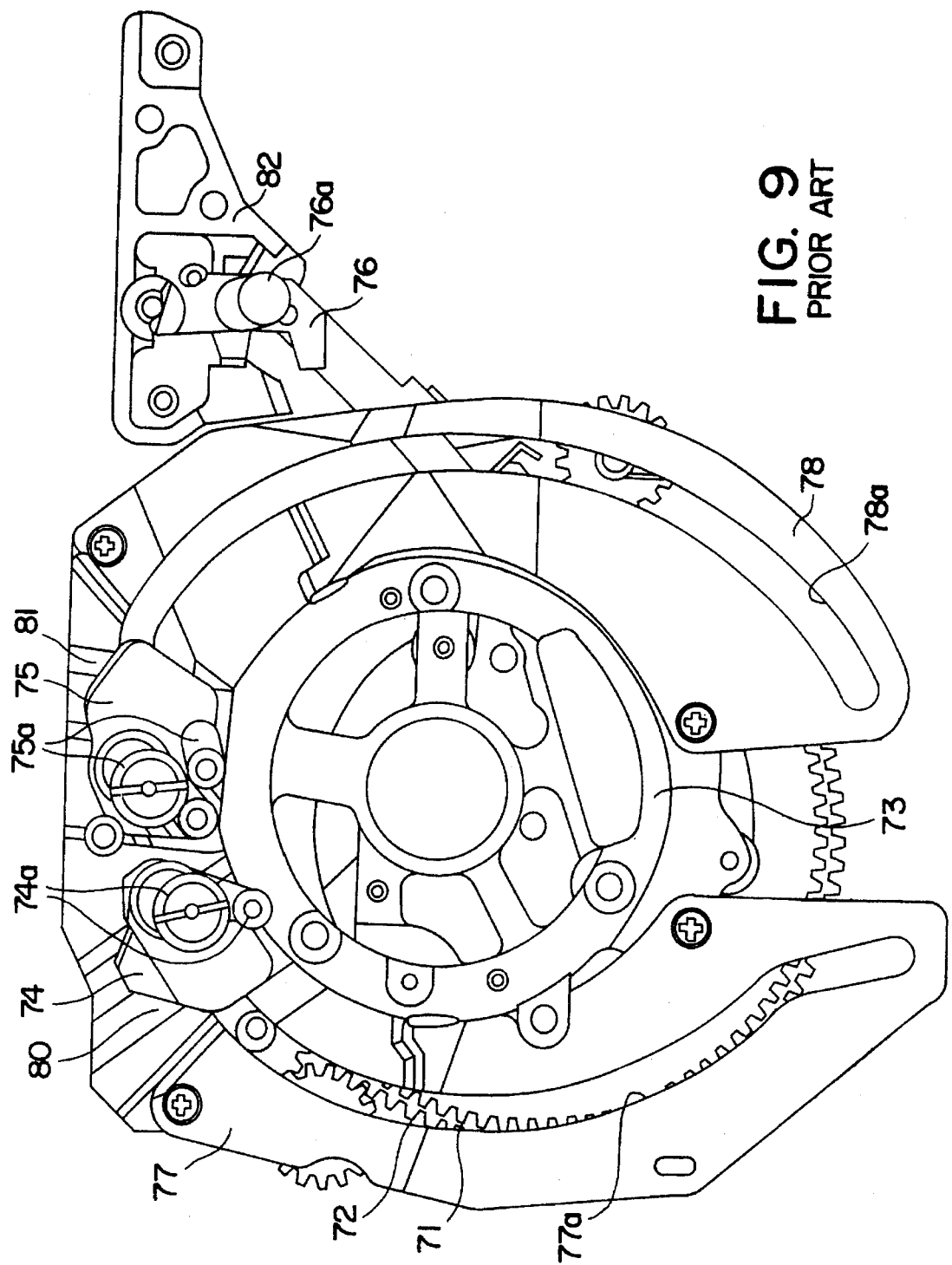
FIG. 9 is a plan view of the VTR shown in FIG. 1 in a loaded state.

When the ring 2 has been moved to a position where the protruding portions 32 of the ring 2 face the corresponding introducing portions 42a of the groove portion 42, as shown in FIG. 7(b), the ring 2 is pivoted in a direction indicated by an arrow I (or in an opposite direction), as shown in FIGS. 6 and 7(c), so as to insert the protruding portions 32 into the groove portion 42 and thereby rotatably support the ring 2 on the drum base 3.

After the ring 2 has been mounted in the manner described above, the ring 1 is rotatably supported on the drum base 3 in the same manner as that of the ring 2 by inserting the protruding portions 31 into the groove portion 41 from the corresponding introducing portions 41a.

Thus, the rings 1 and 2 can be readily supported on the drum base 3 in such a manner as to be rotatable only by inserting the protruding portions 31 and 32 of the rings 1 and 2 into the groove portions 41 and 42 of the ring mounting portion 3a from the introducing portions 41a and 42a, respectively. Also, the rings 1 and 2 can be readily removed from the drum base 3 by performing the aforementioned operation reversely.

After the rings 1 and 2 have been mounted, as shown in FIGS. 2 and 6, the rotary head drum 20 (the fixed drum side thereof) is screwed on the upper surface of the drum base 3 by threading screws (not shown) into the screw inserting holes 50 provided above the recessed portions 45.

In this embodiment, since the screwing insert holes 50 are provided above each of the recessed portions 45, it is possible to insert a screw and the distal end portion of a screw driver into a gap between each of the recessed portions 45 and the ring 1 or 2 (see FIG. 6) by utilizing each of the introducing portions 41a and 42a (which are the notches in the groove portions 41 and 42) to screw the drum base 3. Thus, the rotary head drum 20 can be readily mounted on the drum base 3 and removed from the drum base 3 even after the rings 1 and 2 have been mounted on the drum base 3 regardless of the rotated position of the rings 1 and 2.

The drum base 3 with the rings 1 and 2 supported thereon and with the rotary head drum 20 mounted thereon is mounted on a chassis 25, as shown in FIG. 3. In a normal operation state, the rings 1 and 2 are rotated in the manner described above for loading and unloading the tape.

The rotation angle of the rings 1 and 2 in a normal operation is set to a value which is less than a value at which the protruding portions 31 and 32 are in phase with the recessed portions 45. Thus, meeting of the protruding portions 31 and 32 with the recessed portions 45 and the resultant disengagement of the protruding portions 31 and 32 from the groove portions 41 and 42 are avoided.

Since the distal end portion of each of the protruding portions 31 and 32 has an arcuate form, the sliding resistance between the groove portions 41 and 42 and the protruding portions 31 and 32 is very low. This makes smooth rotation of the rings 1 and 2 possible. To reduce the sliding resistance, the drum base 3 is made of a molded product whose composition includes carbon, and the rings 1 and 2 are made of iron in this embodiment.

Furthermore, since the rings 1 and 2 are supported by the engagement of the protruding portions 31 and 32 with the groove portions 41 and 42 and only the specific portion, such as the distal end, of each of the protruding portions 31 and 32 makes contact with and slides against the groove portion 41 and 42 during the rotation of the rings 1 and 2, removal of burrs (generated during the pressing of the rings 1 and 2) only on that specific portion is enough.

For example, although there are a plurality of introducing portions in each of the groove portions from which a plurality of protruding portions are fitted into the groove portion in the above embodiment, provision of the introducing portions may be eliminated in, for example, a structure in which plate members having different diameters are laid on top of the one another to substantially provide a groove portion and in which a loading ring is mounted when the plate members are laid on top of one another.

Furthermore, although the ring has three protruding portions in this embodiment, it may have four or more protruding portions. If the protruding portion is one which is elongated in the circumferential direction, the provision of only two protruding portions may be enough. In these cases, the introducing portions (the recessed portions) are formed in the groove portion in a number and at positions which correspond to those of the protruding portions.

In the above embodiment, the rotation angle of the ring in a normal operation is set to a value which is less than the value at which the protruding portions are in phase with the introducing portions (the recessed portions) to avoid disengagement of the protruding portions from the groove portion. However, it may also be arranged such that a grooved engaging portion (to be engaged with each of the introducing portions when the drum base is assembled on the chassis) is provided on the chassis to prevent disengagement of the protruding portions even when the rotational angle of the ring is large.

The protruding portions of the ring and the groove portions of the drum base can have any structure if that structure assures that each of the protruding portions can substantially engage with the groove portion. For example, it is not necessary to make the length of each of the protruding portions shorter than that of the groove portion in the circumferential direction, as in the case of the embodiment.

As will be understood from the foregoing description, in the embodiment, the loading ring can be rotatably supported on the drum base by engaging the plurality of protruding portions on the inner peripheral portion of the loading ring with the groove portion on the outer peripheral portion of the drum base. Thus, the rollers, the shafts for rotatably supporting the rollers, and the fixing members (such as molded washers and screws), which would be required in a conventional device, are not necessary. Consequently, the number of parts and the cost for parts are greatly reduced, and the assembly work is greatly simplified.

Furthermore, the support of the loading ring is achieved only by the engagement of the protruding portions with the groove portion, and only the specific portion, such as the distal end, of each of the protruding portions makes contact with and slides against the groove portion. Therefore, removal of burrs (generated during the pressing of the loading ring) only on that specific portion is enough. Also, the burr removing work can be performed very effectively.

Since the groove portion has a plurality of introducing portions from which the plurality of protruding portions are fitted into the groove portion, the loading ring can be supported on the drum base by aligning the protruding portions with the introducing portions and then by rotating the loading ring. Thus, the assembly work is further simplified.

Since the introducing portions are constituted by recessed portions formed on the outer peripheral portion of the drum base, and since the rotary head drum tightening positions are set at the recessed portions, the introducing portions can be utilized as inserting portions through which screws and tools can be inserted for tightening (for example, screwing) the rotary head drum onto the drum base. Thus, the rotary head drum can be mounted on or removed from the drum base even after the loading ring has been mounted on the drum base regardless of the rotated position of the loading ring.

Furthermore, since the sliding portion of each of the protruding portions which makes contact with and slides against the groove portion has an arcuate form, the sliding resistance between the groove portion and the protruding portions can be greatly reduced. This makes smooth rotation of the loading ring possible.

Another feature of the recording/reproducing apparatus shown in FIG. 2 will be described with reference to FIGS. 2, 10, and 11.

The VTR has a tape-supply-side guide base 4 and tape-take-up-side guide bases 5 and 6. These guide bases 4, 5 and 6 carry guide posts for extracting a magnetic tape 21 from a cassette 111 and winding the same on the outer peripheral surface of the rotary drum 20 over a predetermined angle. More specifically, the guide base 4 carries a pair of posts: a rotary post 4a and a stationary post 4b. The guide base 5 also carries a pair of posts: a rotary post 5a and a stationary post 5b. The guide base 6 carries a rotary post 6a.

The guide base 4 and the guide base 5 are a pair of first guide bases which are to be located, respectively, at the tape incoming side and the tape outgoing side of the rotary drum 20. The guide base 6 serves as a second guide base which is located at a position farther from the rotary drum than the guide base 5 is.

There is a pair of rail members: a rail member 7 having an elongated slot 7a for guiding base 4, and a rail member 8 having an elongated slot 8a and a projection 8b for guiding the guide base 5 and the guide base 6. The rail member 7 and the rail member 8 are secured to the drum base 3 and disposed around the rotary drum 20. An arm 1b interconnects the guide base 4 and the loading ring 1, while an arm 2b and an arm 2a respectively interconnect the guide base 5 and the guide base 6 to the loading ring 2.

The drum base 3 has a drum support portion 130 for supporting the rotary drum 20, a pair of first locating portions 131 and 132 which are adopted for locating the pair of first guide bases 4 and 5, respectively, and a second locating portion 133 for locating the second guide base 6. The drum base 3 is integrally formed from plastics so as to include the drum support portion 130 and the location portions 131, 132 and 133.

The first locating portions 131 and 132 are respectively provided with elongated slot 131a and 132a, while the second locating portion 133 is provided with a projection 133a. Locating pins 134, 135 and 136 are integrally formed on the ends of the elongated slot 131a, 132a and the projection 133a. One of the locating pins on the second location portion 133 is provided by a V-shaped block.

The upper surface of the first locating portion 131 and the upper surface of the second locating portion 133 present a common slant surface.

The rail members 7 and 8 are adjoined to the locating portions 131, 132 and 133 of the drum base 3 so that the elongated slots 7a and 8a in the rail members 7 and 8 are connected to the elongated slots 131a and 132a of the locating portions 131 and 132 so as to form a continuous guide projection.

As clearly depicted in FIG. 2, the locating portions 131 and 132 are provided, at their portions adjacent to the portions where they are connected to the rail members 7 and 8, with interconnecting portions 140 and 141 which are formed integrally therewith so as to interconnect over the gaps between opposing portions of the locating portions 131 and 132 which define the respective elongated slots 131a and 132a so as to close the ends of the elongated slots 131a, 132a.

An impedance roller 13 and a take-up-side main slant post 14 are provided on the upper face of the drum base 3.

Figure 10:
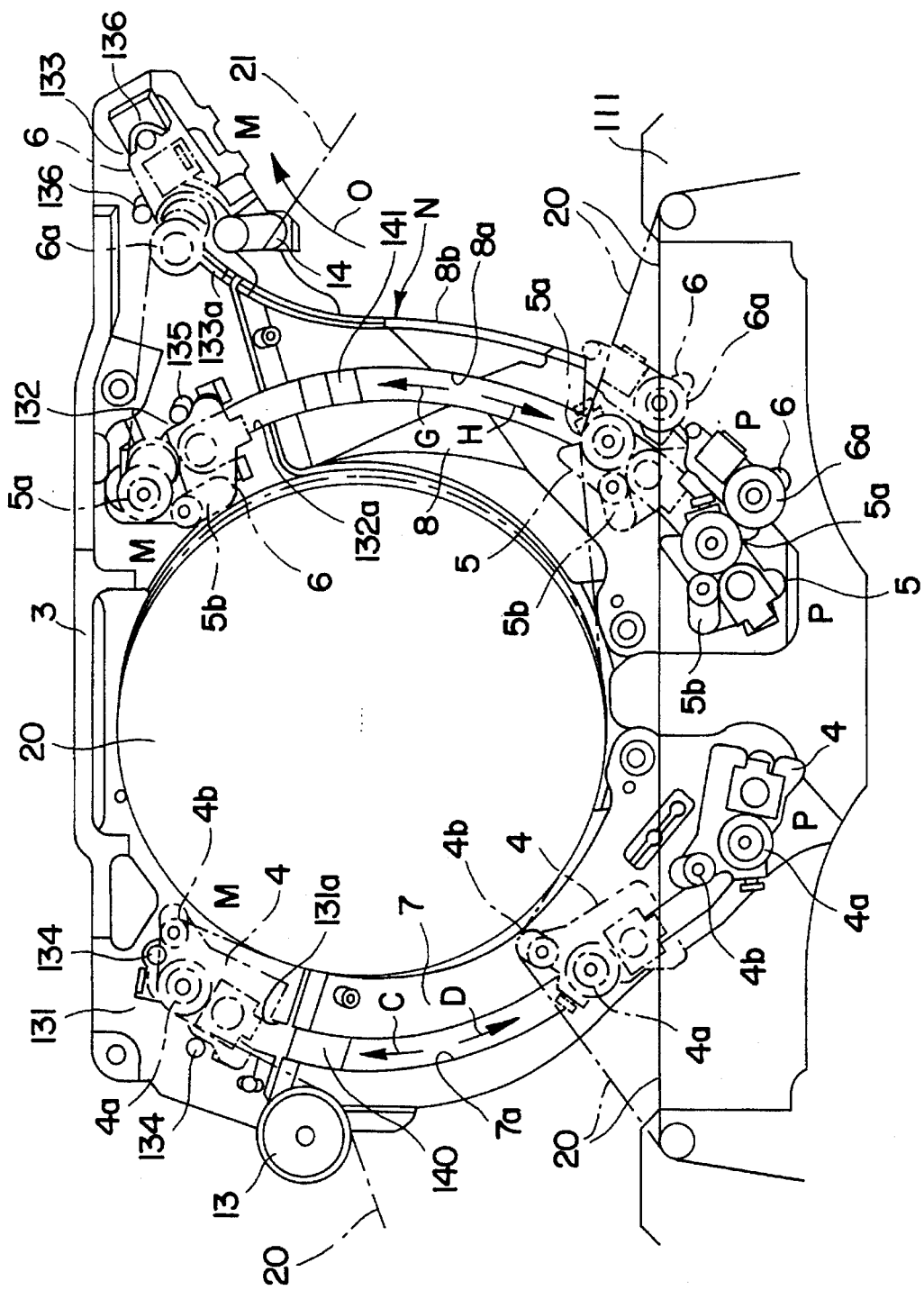
FIG. 10 is a plan view of another feature of the VTR shown in FIG. 2 illustrative of a tape loading operation.

According to this arrangement, before the tape cassette 111 is mounted, the guide bases 4, 5 and 6 and, accordingly, the posts 4a, 4b, 5a, 5b and 6a have been stationed at loading stand-by positions on the back side of the tape 21 as illustrated by full lines in FIG. 10.

When the tape cassette 111 is mounted, a motor (not shown) starts to operate so as to cause rotations of the loading ring 1 and the loading ring 2 in counter directions as indicated by arrows A, B, F and E through the drive gear 11 and the drive gear 12. The rotation of the loading ring 1 causes, through the action of the arm 1b, the guide base 4 to move in a direction C along the elongated slot 7a of the rail member 7. The rotation of the loading ring 2 causes, through the action of the arms 2b and 2c, the guide base 5 and the guide base 6 to move in a direction G along the elongated slot 8a and the projection 8b of the rail member 8.

As a result of the movement of the guide bases 4, 5 and 6, the posts 4a, 4b, 5a, 5b and 6a cooperate to extract the tape 21 from the tape cassette 111 and to wind the same around the rotary drum 20, as indicated by one-dot-and-dash lines in FIG. 10.

The guide bases 4, 5 and 6 are further moved to loading completion positions M shown by two-dot-and-dash lines in FIG. 10 so that the tape 21 is wound on the peripheral surface of the rotary drum 20 over a predetermined angle, thus conforming with the predetermined path of the running of the tape. During the loading operation, the guide base 6 moves along the outer periphery of the rotary drum 20 up to an intermediate position N and then in the direction of an arrow O. In this state, the tape 21 is ready to run for the purpose of recording or reproduction.

Referring again to FIGS. 10 and 11, the guide bases 4, 5 and 6 at the above-mentioned loading completion position M abut the locating pins 134, 135 and 136 integral with the locating portions 131, 132 and 133 so as to be located both in X and Y directions.

As stated before, the locating portions 131, 132 and 133 are formed integrally with the drum support portion 130, so that all the guide bases 4, 5 and 6 are located with a high degree of precision by the drum base 3 which acts as a common position reference for all these guide bases.

Figure 11:
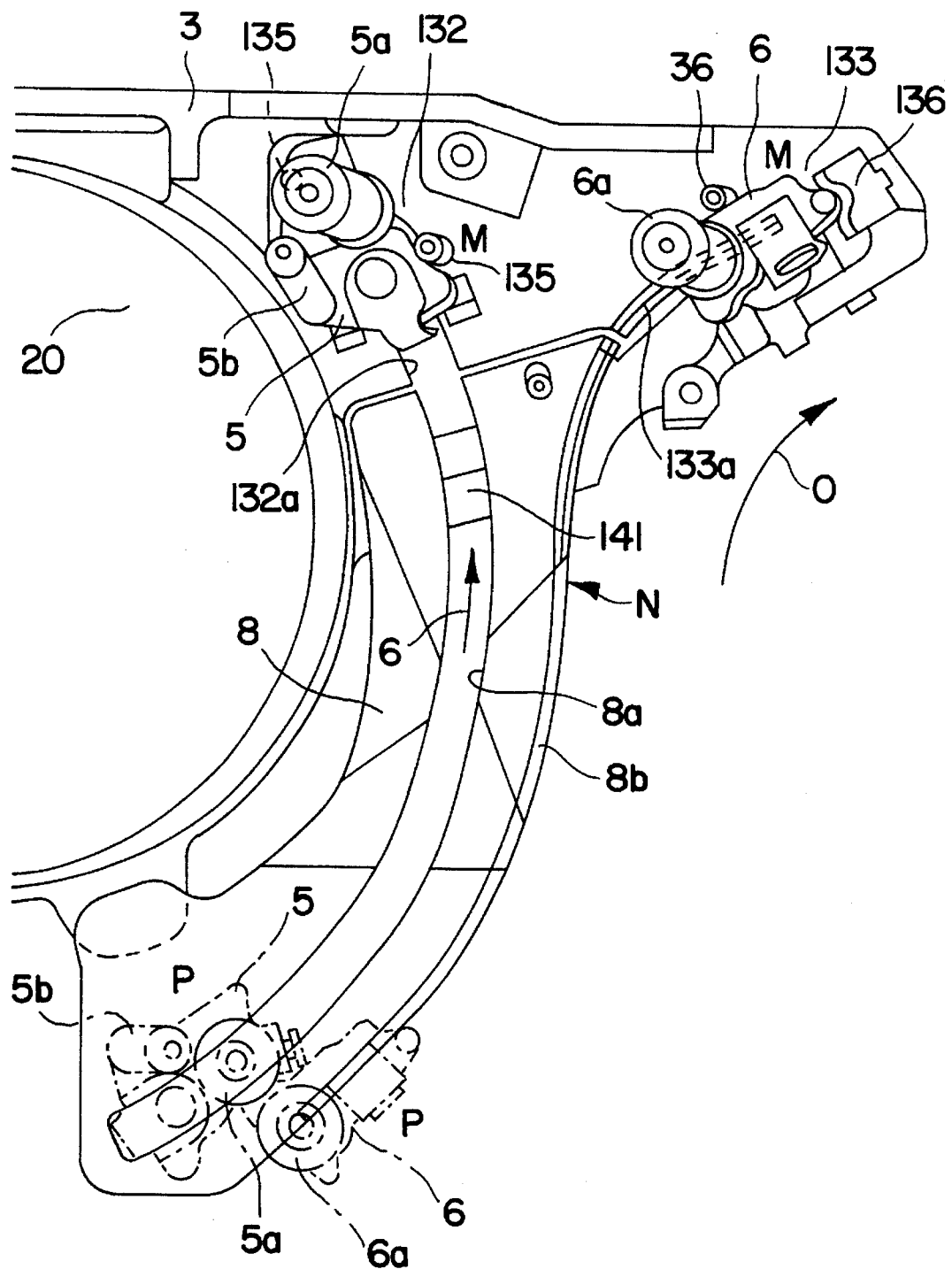
FIG. 11 is an enlarged plan view of a portion of the embodiment of FIG. 10 illustrative of the states in which first and second guide bases are located.

In addition, since the upper faces of the locating portions 132 and 133 are coplanar slant surfaces, the guide bases 5 and 6 are precisely located at the same slanting posture as shown in FIG. 11.

For unloading the tape, the loading ring 1 and the loading ring 2 are respectively rotated in the directions of the arrows B, A and E, F, so that the guide bases 4, 5 and 6 are returned in the directions of arrows D and H so that the posts 4a, 4b, 5a, 5b and 6a are moved from the loading completion position M to the loading stand-by position P.

A description will now be given of a feature of the present invention.

As stated before, the locating portions 131 and 132 of the drum base 3 are adjoined to rail members 7 and 8 so that the elongated slots 131a and 132a of the locating portions 131 and 132 are connected to the elongated slots 7a and 8a of the rail members 7 and 8, thus providing continuous guide grooves which determine the paths of the loading and unloading movements of the guide bases 4 and 5.

In the illustrated embodiment, as will be clear from FIGS. 2, 10 and 11, the locating portions 131 and 132 are integrally provided with interconnecting portions 140 and 141, at their portions adjacent to the portions where they are adjoined to the rail members 7 and 8, respectively, i.e., at the open ends of the elongated slots 131a and 132a, such that the interconnecting portions 140 and 141 interconnect the opposing portions of the respective locating portions 131 and 132 defining the elongated slots 131a and 132a, so as to "close" the open ends of the slots 131a and 132a. These interconnecting portions 140 and 141 are formed at portions of the drum base 3 below the level of the elongated slots 131a and 132a so as not to interfere with the guide bases 4 and 5 during movement of these guide bases 4 and 5.

When the guide bases 4 and 5 are located by the locating portions 131 and 132, the portions of the locating portions 131 and 132 defining the outer side edges of the elongated slot 131a and 132a are excessively loaded by the guide bases 4 and 5 so as to be deformed. This problem, however, is overcome in the embodiment depicted in FIG. 2 by virtue of the presence of the interconnecting portions 140 and 141 which interconnect the opposing portions of the respectively locating portions 131 and 132 defining the elongated grooves 131a and 132a so as to close the ends of these grooves 131a and 132a, because such interconnecting portion serve to stiffen the loaded portions defining the outer side edges of the elongated slots 131a and 132a so as to prevent outward deformation of the elongated slots. Thus, the undesirable deformation of the locating portions 131 and 132 provided on the drum base 3 is effectively suppressed.

As described above, the interconnecting portions are provided on the locating portions 131 and 132 at regions near the ends of these locating portions where they are adjoined to the rail members 7 and 8. This arrangement, however, is not exclusive and the arrangement may be such that similar interconnecting portions are provided on the rail members 7 and 8 at positions near the ends of these rail members 7 and 8 where they are adjoined to the locating portions 131 and 132 on the drum base 3. In such a case, the interconnecting portions 140 and 141 interconnect opposing portions of the respective rail members 7 and 8 across the elongated slots 7a and 8a so as to stiffen the portions of both rail members defining the elongated slots 7a and 8a. The rail members 7 and 8 also may be molded from plastics.

Thus, interconnecting portions 140 and 141 may be provided either to interconnect the opposing portions of the respective locating portions 131 and 132 across the elongated slots 131a and 132a or to interconnect the opposing portions of the respective rail members 7 and 8 across the elongated slots 7a and 8a or, alternatively, these interconnecting portions may be provided both on the locating means 131, 132 and the rail members 7 and 8.

In the present embodiment, interconnecting portions 140, 141 may also be used as mount portions for connecting rail members 7 and 8 with drum base 3.

As will be understood from the foregoing description, the present invention offers, due to the provision of the interconnecting portions, an advantage in that the drum base 3, which hitherto has to be produced by, for example, aluminum die casting due to strength requirements, can be formed by molding from plastics. The interconnecting portions also prevent undesirable deformation which otherwise may occur in the course of the molding.

The individual components shown in outline or designated by blocks in the Drawings are all well-known in the tape loading arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A tape recorder apparatus, comprising:

a rotary drum carrying at least one magnetic head;

at least one rail member arranged in the vicinity of said rotary drum and having a first elongated slot formed therein;

at least one tape guide which is guided along said rail member;

a drum base having a drum support portion for supporting said rotary drum, and a second elongated slot formed at the outer side of said drum support portion, said second elongated slot being connected to said first elongated slot so as to form a continuous guide groove for guiding said tape guide; and an interconnector which is provided on said drum base so as to interconnect the portions of said drum base which oppose each other across said second elongated slot in a region near an open end of the second elongated slot.

2. Apparatus according to claim 1, wherein said drum base is molded.

3. Apparatus according to claim 2, wherein said interconnector is disposed below said second elongated slot.

4. Apparatus according to claim 1, wherein said interconnector is disposed below said second elongated slot.

5. A tape recorder apparatus, comprising:

a rotary drum carrying at least one magnetic head;

at least one rail member arranged in the vicinity of said rotary drum and having a first elongated slot formed therein and an interconnector which is provided on said rail member so as to interconnect the portions of said rail member which oppose each other across said first elongated slot in a region near an open end of the first elongated slot;

at least one tape guide which is guided along said rail member; and a drum base having a drum support portion for supporting said rotary drum, and a second elongated slot formed at the outer side of said drum support portion, said second elongated slot being connected to said first elongated slot so as to form a continuous guide groove for guiding said tape guide.

6. An apparatus according to claim 5, wherein said rail member is molded.

7. An apparatus according to claim 6, wherein said interconnector is disposed below said first elongated slot.

8. An apparatus according to claim 5, wherein said interconnector is disposed below said first elongated slot.

* * * * *

UNITED STATES PATENT AND TRADEMARK OFFICE
CERTIFICATE OF CORRECTION

PATENT NO. : 5,550,686
DATED : August 27, 1996
INVENTOR(S) : HIDETOSHI MATSUOKA, ET AL.

It is certified that error appears in the above-indentified patent and that said Letters Patent is hereby corrected as shown below:

Column 2,
　　　line 5, "ad" should read --and--.

Column 3,
　　　line 50, "portion" should read --portions--.

Column 7,
　　　line 10, "slot" should read --slots--; and
　　　line 13, "slot" should read --slots--.

Column 8,
　　　line 48, "slot" should read --slots--; and
　　　line 56, "tion" should read --tions--.

Signed and Sealed this

Twenty-first Day of January, 1997

Attest:

BRUCE LEHMAN

*Attesting Officer*　　　*Commissioner of Patents and Trademarks*